(12) United States Patent
Ray et al.

(10) Patent No.: US 11,182,565 B2
(45) Date of Patent: Nov. 23, 2021

(54) METHOD TO LEARN PERSONALIZED INTENTS

(71) Applicant: Samsung Electronics Co., Ltd., Suwon-si (KR)

(72) Inventors: Avik Ray, Sunnyvale, CA (US); Yilin Shen, Sunnyvlae, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 15/904,203

(22) Filed: Feb. 23, 2018

(65) Prior Publication Data
US 2019/0266237 A1  Aug. 29, 2019

(51) Int. Cl.
| | |
|---|---|
| *G06F 40/35* | (2020.01) |
| *G10L 15/18* | (2013.01) |
| *G06F 3/16* | (2006.01) |
| *G06F 40/30* | (2020.01) |
| *G06F 40/247* | (2020.01) |
| *G06F 40/295* | (2020.01) |
| *G10L 15/07* | (2013.01) |
| *G06F 40/216* | (2020.01) |

(52) U.S. Cl.
CPC ............... *G06F 40/35* (2020.01); *G06F 3/167* (2013.01); *G06F 40/216* (2020.01); *G06F 40/247* (2020.01); *G06F 40/295* (2020.01); *G06F 40/30* (2020.01); *G10L 15/075* (2013.01); *G10L 15/1822* (2013.01)

(58) Field of Classification Search
CPC .......... G06F 9/46; G06F 17/30; G06F 16/313; G06F 16/319; G09B 25/00

USPC ..... 704/9, 270, 275, 235, 254, 8, 2; 718/102
See application file for complete search history.

(56) References Cited

U.S. PATENT DOCUMENTS 7,987,176 B2     7/2011  Latzina et al.
8,041,697 B2 *  10/2011  Rayner ................. G06F 16/313
                                                                  707/705
(Continued)

FOREIGN PATENT DOCUMENTS

| JP | 2002215184 A | 7/2002 |
|---|---|---|
| JP | 2005321520 A | 11/2005 |

(Continued)

OTHER PUBLICATIONS

Azaria, A. et al., "Instructable Intelligent Personal Agent," In 30th AAAI Conference on Artificial Intelligence, pp. 2681-2689. Feb. 2016, United States.

(Continued)

*Primary Examiner* — Akwasi M Sarpong
(74) *Attorney, Agent, or Firm* — Sherman IP LLP; Kenneth L. Sherman; Steven Laut

(57) ABSTRACT

A method includes retrieving, at an electronic device, a first natural language (NL) input. An intent of the first NL input is undetermined by both a generic parser and a personal parser. A paraphrase of the first NL input is retrieved at the electronic device. An intent of the paraphrase of the first NL input is determined using at least one of: the generic parser, the personal parser, or a combination thereof. A new personal intent for the first NL input is generated based on the determined intent. The personal parser is trained using existing personal intents and the new personal intent.

20 Claims, 11 Drawing Sheets

(56) References Cited

U.S. PATENT DOCUMENTS

| | | | |
|---|---|---|---|
| 8,478,780 B2 | 7/2013 | Cooper et al. | |
| 8,612,204 B1 | 12/2013 | Uszkoreit et al. | |
| 8,935,676 B2* | 1/2015 | Verbest | G06F 11/3672 |
| | | | 717/131 |
| 9,117,450 B2 | 8/2015 | Cook et al. | |
| 9,147,395 B2 | 9/2015 | Kim et al. | |
| 9,262,404 B2* | 2/2016 | Ingram | G06F 11/3684 |
| 9,529,794 B2 | 12/2016 | Levit et al. | |
| 9,684,496 B1* | 6/2017 | Reid | G06F 8/425 |
| 9,710,243 B2* | 7/2017 | O'Hara | G06F 8/71 |
| 9,711,056 B1* | 7/2017 | Nguyen | G09B 5/02 |
| 9,922,642 B2 | 3/2018 | Pitschel et al. | |
| 9,966,065 B2* | 5/2018 | Gruber | G06F 40/205 |
| 10,445,423 B2 | 10/2019 | Boguraev et al. | |
| 10,528,343 B2* | 1/2020 | Gass | G06F 8/425 |
| 10,592,313 B2* | 3/2020 | Geleji | G06F 8/20 |
| 2003/0204391 A1* | 10/2003 | May | G06F 16/258 |
| | | | 704/8 |
| 2007/0038436 A1* | 2/2007 | Cristo | G06F 40/232 |
| | | | 704/9 |
| 2007/0112714 A1* | 5/2007 | Fairweather | G06K 13/0825 |
| | | | 706/46 |
| 2008/0195601 A1* | 8/2008 | Ntoulas | G06F 16/313 |
| 2010/0088262 A1* | 4/2010 | Visel | G06N 3/02 |
| | | | 706/18 |
| 2010/0312469 A1* | 12/2010 | Chen | G10L 15/193 |
| | | | 701/408 |
| 2012/0016678 A1* | 1/2012 | Gruber | G06F 9/54 |
| | | | 704/275 |
| 2013/0041669 A1 | 2/2013 | Ben-David et al. | |
| 2013/0073571 A1 | 3/2013 | Coulet et al. | |
| 2013/0152092 A1* | 6/2013 | Yadgar | G10L 15/22 |
| | | | 718/102 |
| 2013/0311166 A1* | 11/2013 | Yanpolsky | G06F 16/3329 |
| | | | 704/2 |
| 2014/0163965 A1* | 6/2014 | Barve | G06F 40/205 |
| | | | 704/235 |
| 2014/0180692 A1* | 6/2014 | Joshi | G06F 16/683 |
| | | | 704/254 |
| 2014/0222422 A1 | 8/2014 | Sarikaya et al. | |
| 2014/0272821 A1 | 9/2014 | Pitschel et al. | |
| 2015/0039292 A1 | 2/2015 | Suleman et al. | |
| 2015/0134334 A1 | 5/2015 | Sachidanandam et al. | |
| 2015/0149177 A1 | 5/2015 | Kalns et al. | |
| 2015/0161984 A1 | 6/2015 | Vanblon et al. | |
| 2015/0186504 A1* | 7/2015 | Gorman | G06F 11/3684 |
| 2015/0317302 A1 | 11/2015 | Liu et al. | |
| 2015/0348551 A1* | 12/2015 | Gruber | H04M 3/4936 |
| | | | 704/235 |
| 2015/0356142 A1* | 12/2015 | Proux | G06F 16/334 |
| | | | 706/11 |
| 2016/0062982 A1* | 3/2016 | Wroczynski | G06F 40/211 |
| | | | 704/9 |
| 2016/0111084 A1 | 4/2016 | Bang et al. | |
| 2016/0179785 A1 | 6/2016 | Ashtiani et al. | |
| 2016/0225370 A1 | 8/2016 | Kannan et al. | |
| 2017/0125020 A1 | 5/2017 | Seo | |
| 2017/0140754 A1 | 5/2017 | Ichimura | |
| 2017/0220559 A1 | 8/2017 | Fujiwara et al. | |
| 2017/0221475 A1 | 8/2017 | Bruguier et al. | |
| 2017/0365252 A1* | 12/2017 | Ushio | G06F 40/30 |
| 2018/0011838 A1 | 1/2018 | Beller et al. | |
| 2018/0033435 A1 | 2/2018 | Jacobs | |
| 2019/0361978 A1 | 11/2019 | Ray et al. | |

FOREIGN PATENT DOCUMENTS

| | | |
|---|---|---|
| JP | 4064413 B2 | 1/2007 |
| JP | 2007323296 A | 12/2007 |
| JP | 2010-256498 | 11/2010 |
| JP | 4680714 B2 | 2/2011 |
| KR | 2010-0027865 | 3/2010 |
| KR | 20140037519 A | 3/2014 |
| KR | 2010-1399777 | 5/2014 |
| WO | 2018071594 A | 4/2018 |
| WO | 2018081833 A | 5/2018 |

OTHER PUBLICATIONS

International Search Report and Written Opinion dated Jul. 1, 2019 for International Application PCT/KR2019/002406 from Korean Intellectual Property Office, pp. 1-11, Republic of Korea.

International Search Report and Written Opinion dated May 21, 2019 for International Application PCT/KR2019/002024 from Korean Intellectual Property Office, pp. 1-10, Republic of Korea.

Liu, X. et al., "Paraphrase Features to Improve Natural Language Understanding", pp. 3776-3779, Interspeech 2013, Aug. 25-29, 2013, United States.

Amos, A., et al., "Instructable Intelligent Personal Agent." In 30th AAAI Conference on Artificial Intelligence, pp. 2681-2689. Feb. 2016, United States.

U.S. Non-Final Office Action for U.S. Appl. No. 15/986,633 dated Feb. 26, 2020.

U.S. Restriction Requirement for U.S. Appl. No. 15/986,633 dated Dec. 9, 2019.

U.S. Final Office Action for U.S. Appl. No. 15/986,633 dated Sep. 8, 2020.

U.S. Advisory Action for U.S. Appl. No. 15/986,633 dated Nov. 5, 2020.

Extended European Search Report dated Oct. 20, 2020 for European Application No. 19757283.7 from European Patent Office, pp. 1-8, Munich, Germany.

Extended European Search Report dated Oct. 30, 2020 for European Application No. 19807753.9 from European Patent Office, pp. 1-7, Munich, Germany.

U.S. Non-Final Office Action for U.S. Appl. No. 15/986,633 dated Dec. 3, 2020.

U.S. Non-Final Office Action for U.S. Appl. No. 15/986,633 dated Jul. 8, 2021.

U.S. Advisory Action for U.S. Appl. No. 15/986,633 dated Jun. 21, 2021.

U.S. Final Office Action for U.S. Appl. No. 15/986,633 dated Mar. 22, 2021.

Indian Office Action dated Jun. 27, 2021 for Indian Application No. 202037045078 from Intellectual Property India, pp. 1-7, Chennai, India.

* cited by examiner

METHOD TO LEARN PERSONALIZED INTENTS

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to virtual assistants and, in particular, to personalized intent learning of personalized expressions.

BACKGROUND

Customers use voiced based personal assistants such as AMAZON® ALEXA®, GOOGLE ASSISTANT®, SIRI®, MICROSOFT CORTANA®, and SAMSUNG BIXBY® to answer questions, solve problems, perform tasks that save time, energy, and make their lives more convenient. Intent parsers are at the core of the artificial intelligence (AI) technologies, which convert a natural language (NL) query by a user to an intent class that is then executed by calling a predefined action routine. These intent parsers are trained using machine learning techniques on large labeled datasets having most commonly used user queries/expressions along with their corresponding intents. These datasets, however, are never exhaustive due to potentially numerous ways of paraphrasing a sentence expressing a particular intent. Often times a user experiences that these AI assistants are unable to correctly infer their desired intents. This may be amplified due to the fact that language usage varies from person to person, each having their own speaking styles and preference.

SUMMARY

One or more embodiments generally relate to intent learning of personalized expressions for intelligent personal assistants. In one embodiment, a method includes retrieving, at an electronic device, a first natural language (NL) input. An intent of the first NL input is undetermined by both a generic parser and a personal parser. A paraphrase of the first NL input is retrieved at the electronic device. An intent of the paraphrase of the first NL input is determined using at least one of: the generic parser, the personal parser, or a combination thereof. A new personal intent for the first NL input is generated based on the determined intent. The personal parser is trained using existing personal intents and the new personal intent.

In another embodiment, an electronic device includes a memory storing instructions. At least one processor executes the instructions including a process configured to: retrieve a first NL input. An intent of the first NL input is undetermined by both a generic parser and a personal parser. The process is further configured to retrieve a paraphrase of the first NL input; determine an intent of the paraphrase of the first NL input using at least one of: the generic parser, the personal parser, or a combination thereof; generate a new personal intent for the first NL input based on the determined intent; and train the personal parser using existing personal intents and the new personal intent.

In one embodiment a non-transitory processor-readable medium that includes a program that when executed by a processor performing a method that includes retrieving, at an electronic device, a first NL input. An intent of the first NL input is undetermined by both a generic parser and a personal parser. A paraphrase of the first NL input is retrieved at the electronic device. An intent of the paraphrase of the first NL input is determined using at least one of: the generic parser, the personal parser, or a combination thereof. A new personal intent for the first NL input is generated based on the determined intent. The personal parser is trained using existing personal intents and the new personal intent.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
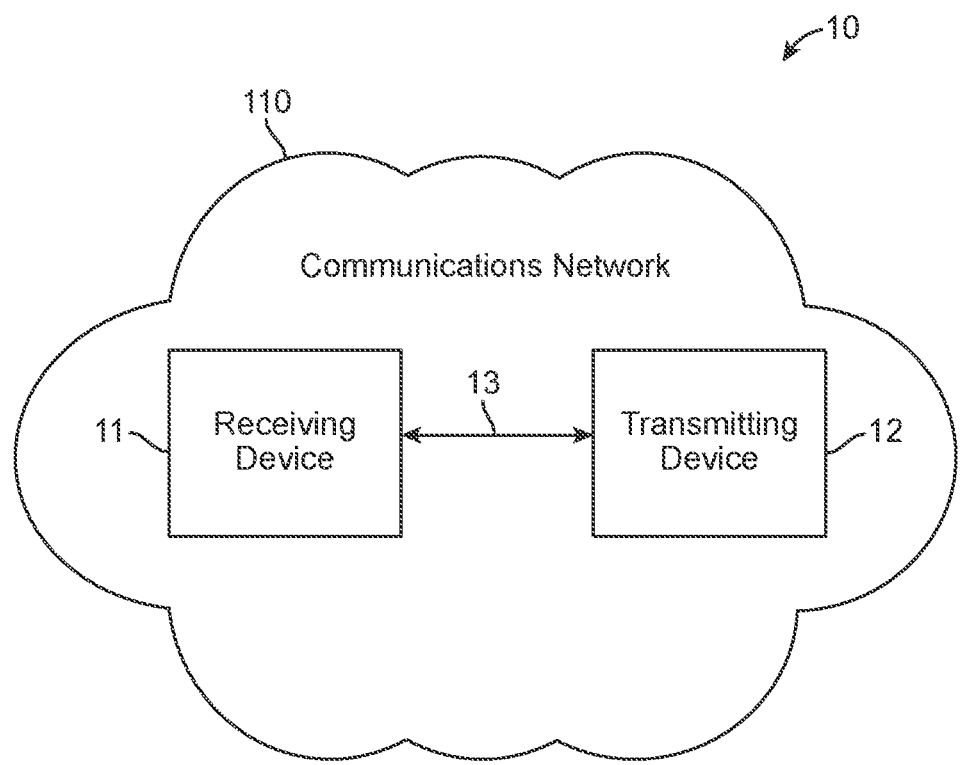
FIG. 1 shows a schematic view of a communications system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for intent learning of personalized expressions for intelligent personal assistants. Some embodiments include a method that includes retrieving, at an electronic device, a first natural language (NL) input. An intent of the first NL input is undetermined by both a generic parser and a personal parser. A paraphrase of the first NL input is retrieved at the electronic device. An intent of the paraphrase of the first NL input is determined using at least one of: the generic parser, the personal parser, or a combination thereof. A new personal intent for the first NL input is generated based on the determined intent. The personal parser is trained using existing personal intents and the new personal intent.

In some embodiments, a personal assistant (PA) NL understanding (NLU) system includes two parsers, a 'generic intent parser' that is the same for every user, and a 'personal paraphrase retriever' (personal parser) that is private and different (i.e., personalized) for every user. A 'Learn New Intent' process provides for a user to define new personalized intents, when both the generic parser and the personal paraphrase retriever fail to determine the intent of a user NL input X (e.g., "find me a ride to the airport"). A user may define any new intent, which may be combinations of default intent (e.g., intent that is common, such as making a phone call, launching a web address, sending an email or text message, etc.) and personalized intent. In one embodiment, the personal paraphrase retriever does not need access to the training data (dataset) used to train the generic intent parser, and therefore may be used with $3^{rd}$ party parsers.

One or more embodiments may be easily scaled to support millions of users, and provides an interface to allow a user to rephrase/explain the personalized expression (e.g., converted voice to text, textual input, etc.). Some embodiments integrate a personalized intent parser (personal paraphrase retriever) with an existing intent parser, such that it enhances the combined system's intent parsing capability, and is tailored to the end user. One or more embodiments may be integrated into existing parsers and integrated in off-the-shelf PAs. A personalized intent parser may understand a complex user expression and map it to possibly a sequence of simpler expressions, and provides a scalable process involving the personalized parser that learns to understand more and more personalized expressionsover time.

Some of the advantages of one or more embodiments over the conventional PAs are that the processing does not need to access the training data of an existing intent parser. Some embodiments do not need to modify parameters of an existing intent parser in order to learn a new intent. A separate lexical generalization algorithm is not necessary for one or more embodiments. Additionally, some embodiments are more scalable, practical and have less retraining overhead than conventional PAs.

Some embodiments improve the personalized language understanding capabilities of an intelligent PA. Moreover, some embodiments can be easily integrated to any existing intent parser (without actually modifying it). When encountering an expression which the intent parser can not parse, the user is provided the opportunity of paraphrasing the expressionusing single or multiple simpler expressions, which can be parsed. Using this paraphrased example provided by the user, a custom user specific personalized intent parser is then trained using machine learning techniques such that the next time the user expresses the same intent using similar (but need not be exactly same) expression, the overall processing by the PA now automatically parses the expression to the desired intent of the user (e.g., for performing the desired action(s)).

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a) BLACKBERRY®). Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to mobile telephone devices, television systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, data and control information, voice communications (e.g., telephone calls), data communications (e.g., e-mails, text messages, media messages), video communication, or combinations of these (e.g., video conferences).

Figure 2:
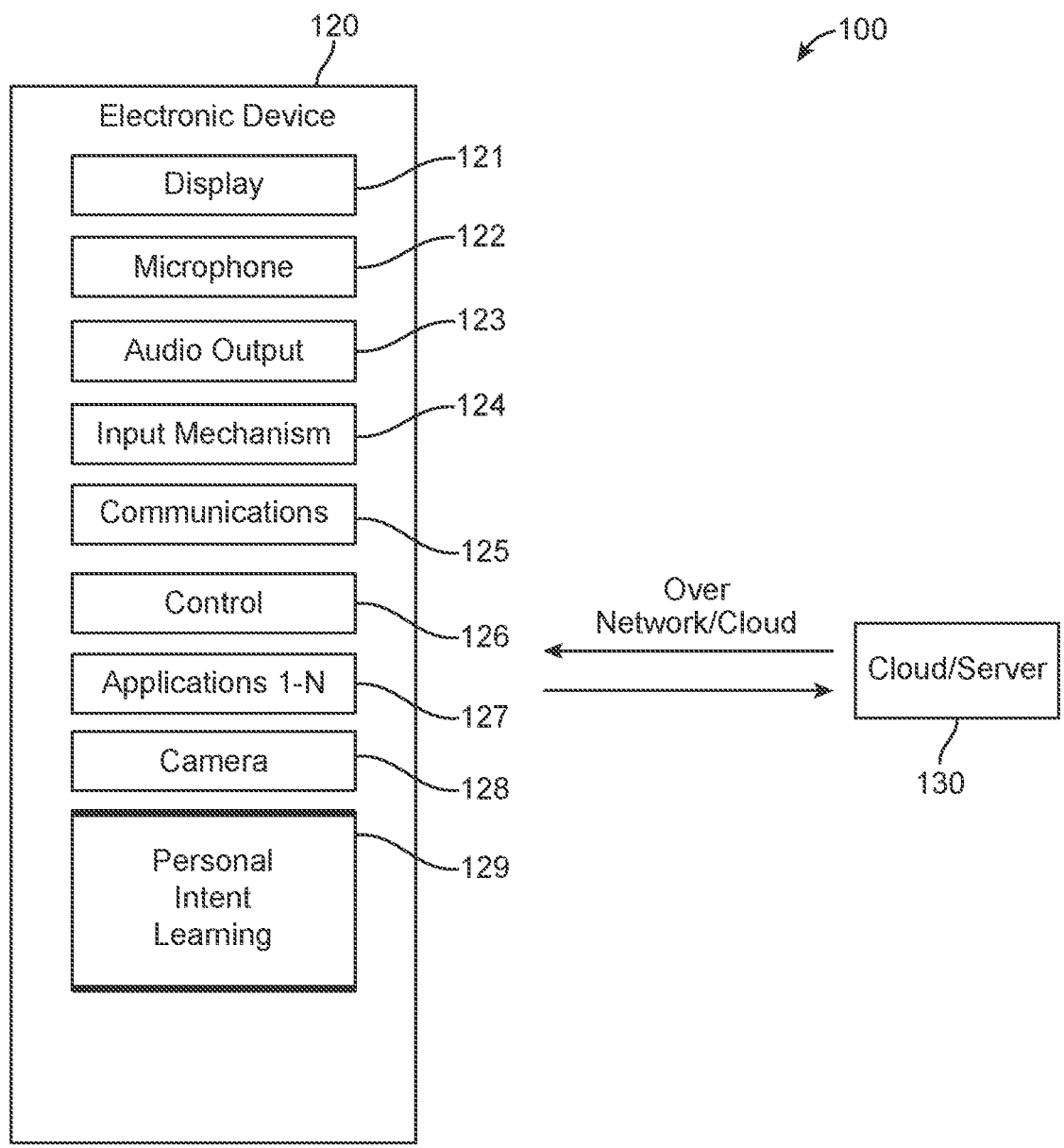
FIG. 2 shows a block diagram of architecture for a system including an electronic device including a personal intent learning app, according to some embodiments.

FIG. 2 shows a functional block diagram of an architecture system 100 that may be used for PAs to enhance natural language understanding capabilities and personalization for PAs such as BIXBY® using an electronic device 120 (e.g., mobile telephone devices, television (TV) systems, cameras, camcorders, a device with audio video capabilities, tablets, pad devices, wearable devices, smart appliances, smart picture frames, smart lighting, etc.). Both the transmitting device 12 (FIG. 1) and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera 128, a personal intent learning (or PA) app 129 (including a personal paraphrase retriever 520 (FIGS. 5, and 7-9) and machine learning (ML) for learning personal intent from personal expressions), and communicating with the communications circuitry 125 to obtain/provide information thereof with the cloud or server 130; and may include any of the processing for, but not limited to, the examples and embodiments as described below), and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOW, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, a map application, a media application (e.g., QuickTime, MobileMusic.app, or MobileVideo.app), social networking applications (e.g., FACEBOOK®, INSTAGRAM®, TWITTER®, etc.), a calendaring application (e.g., a calendar for managing events, appointments, etc.), an Internet browsing application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
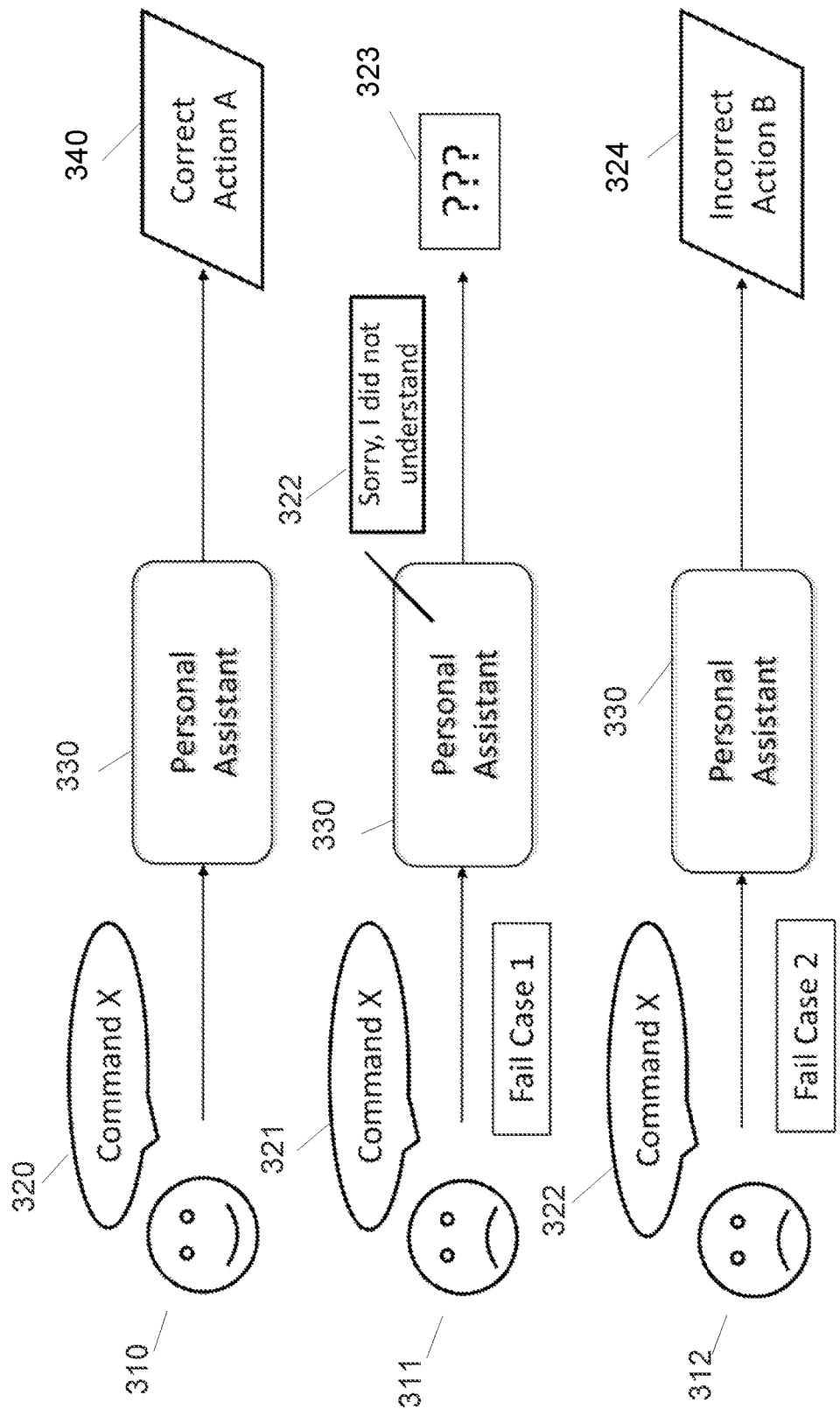
FIG. 3 shows example usage of a virtual personal assistant (PA) for correct and incorrect natural language (NL) expression understandings.

FIG. 3 shows example usage of a PA for correct and incorrect NL expression understandings. Conventional intelligent PAs have a pre-trained intent parser (generic intent parser) which may map a NL query to an intent class, and take an appropriate action, depending on the class. The conventional generic intent parser is the same for every user, and it is not personalized to individuals. In a first scenario 310, a command X 320 NL expression is received by a generic intent parser of the PA 330. In the first scenario 310, the command X 320 is understood by the generic intent parser of the PA 330, and the PA 330 issues the correct action A 340.

In the second scenario 311, a command X 321 NL expression is received by the generic intent parser of the PA 330, but the generic intent parser of the PA 330 did not determine/understand the intent from the NL expression (command X 321) with sufficient confidence, and relays the output 322 (e.g., simulated voice) of "Sorry, I did not understand." Thus, no action 323 is taken. This is referred to as Fail Case 1. In Fail Case 1, conventional PAs would wait for another expression that the generic intent parser can understand.

In the third scenario 312, the command X 322 NL expression is received by the generic intent parser of the PA 330. The generic intent parser of the PA 330 misunderstands the intent and issues an incorrect action B 324. This is referred to as Fail Case 2. With Fail Case 2, users may become frustrated or may have to undo an incorrect action B 324, and then repeat another/new NL expression until the generic intent parser of the PA 330 can understand the intent.

Figure 4:
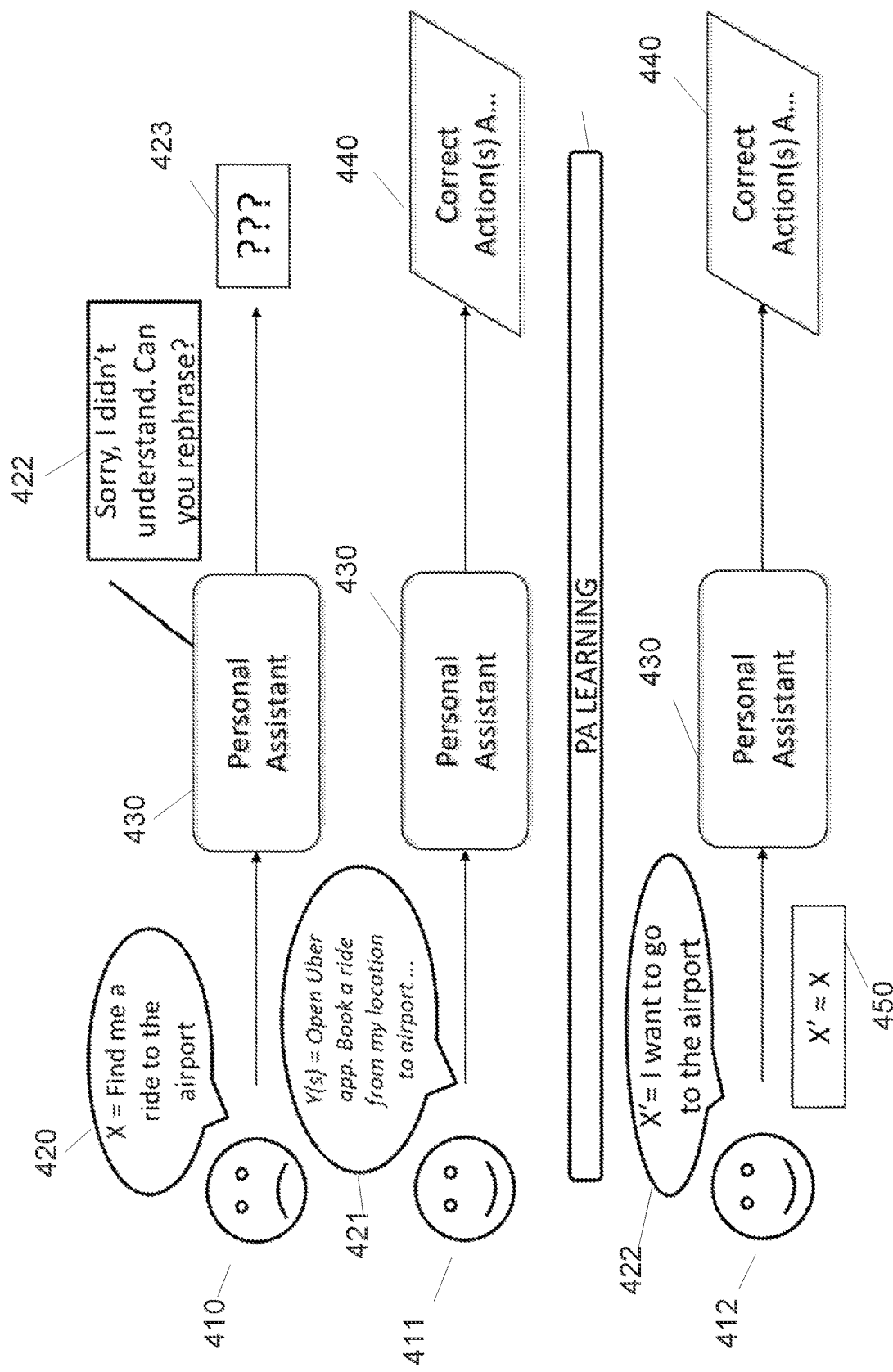
FIG. 4 shows an example PA scenario of NL expression intent learning, according to some embodiments.

FIG. 4 shows example PA scenarios of NL expression intent learning, according to some embodiments. In a first scenario 410, a command X 420 (X=Find me a ride to the airport) NL expression is received by a generic intent parser and a personal intent parser of the PA 430. In the first scenario 410, the command X 420 is not understood by either the generic intent parser or the personal intent parser of the PA 430, and the PA 430 outputs a response 422 of "Sorry, I didn't understand. Can you rephrase?". Since the PA 430 could not understand the intent, no action 423 is taken.

In some embodiments, in the second scenario 411, a paraphrase/rephrase command Y(s) 421 NL expression is received by the generic intent parser of the PA 430. The generic parser of the PA 430 understands the intent of the paraphrase/rephrase command Y(s) 421 NL expression, and issues a correct action(s) A 440. The personal intent parser of the PA 430 learns the intent of command X 420 using machine learning techniques to have the intent of the paraphrase/rephrase command Y(s) 421 (e.g., the intent dataset is updated based on the user's understood personal intent). In the third scenario 412, a command X' 422 NL expression of "I want to go to the airport" is received by the generic intent parser of the PA 430 that accesses the updated dataset. The PA 430 understands the command X' to equal to the command X 420 (i.e., X'=X at 450), and issues the correct action(s) A 440. The following described embodiments provide further details of personalized PA learning and use of the personal intent parser (e.g., personal paraphrase retriever 520, FIGS. 5-9).

Figure 5:
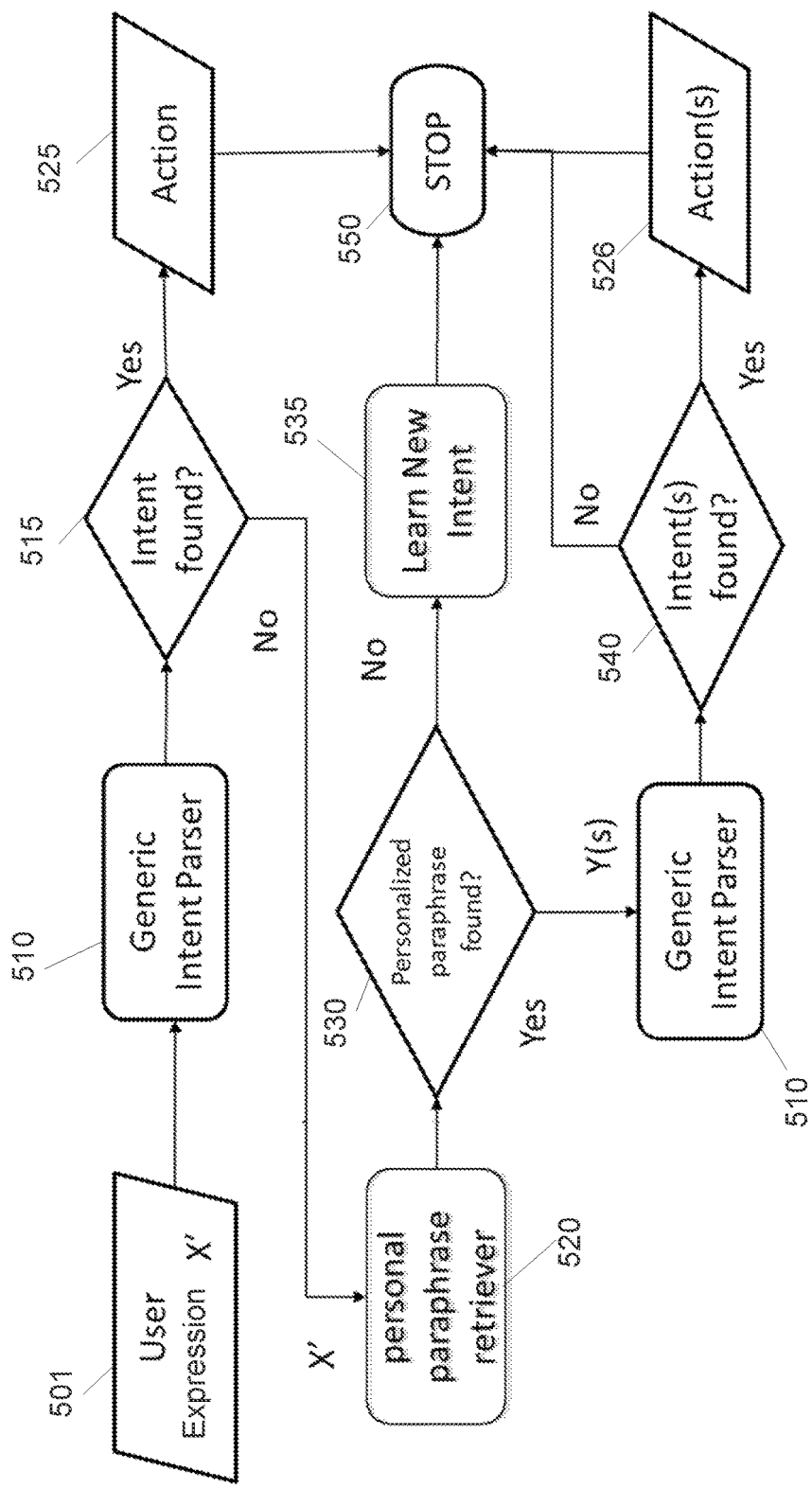
FIG. 5 shows a block diagram for reactive intent parsing for a PA, according to some embodiments.

FIG. 5 shows a block diagram for reactive intent parsing for a PA (e.g., a PA application 129 (FIG. 2), according to some embodiments. In block 501, an electronic device (e.g., electronic device 120, FIG. 2) parses an NL (user) expression X' 501 using the generic intent parser 510 of the PA. The generic parser 510 determines at block 515 if the intent of the expression X' 501 is found. If the intent is found in block 515, then the PA issues the corresponding action in block 525 and proceeds to block 550 and stops (e.g., waits for the next NL expression command). Otherwise, if no intent was found in block 515 by the generic intent parser 510, in block 520 the expression X' 501 is sent to a personal paraphrase retriever (personalized intent parser) 520 of the PA. At block 530, it is determined whether the personalized paraphrase is found in the PA dataset to determine the intent(s). If the personalized paraphrase and intent(s) is(are) found in the PA, (e.g., expressed in a sequence of expressions Y(s)), the expression sequence Y(s) is sent again to the generic intent parser 510 to be parsed. If the intent(s) is(are) found in block 540, then the action(s) 526 is(are) issued by the PA and executed. The PA then proceeds to block 550 and stops (e.g., waits for the next NL expression command). If the personalized paraphrase is not found in block 530, then the expression X' is learned using a machine learning technique at block 535 (Learn New Intent algorithm) and the intent(s) and paraphrase(s) are added to the dataset (for following/future NL expressions) and the PA stops at block 550 (e.g., waits for the next NL expression with the updated dataset).

Using reactive intent parsing for a PA, the Fail Case 1 (FIG. 3) may be mitigated in the sense that it only happens once for a particular expression X. If the user chooses to define this expression X as a new paraphrased/personalized intent, then next time the NL expression X is received by the generic intent parser 510, the generic intent parser 510 queries X' functionally similar to X to correctly parse the expression X to obtain the correct intent(s).

Figure 6:
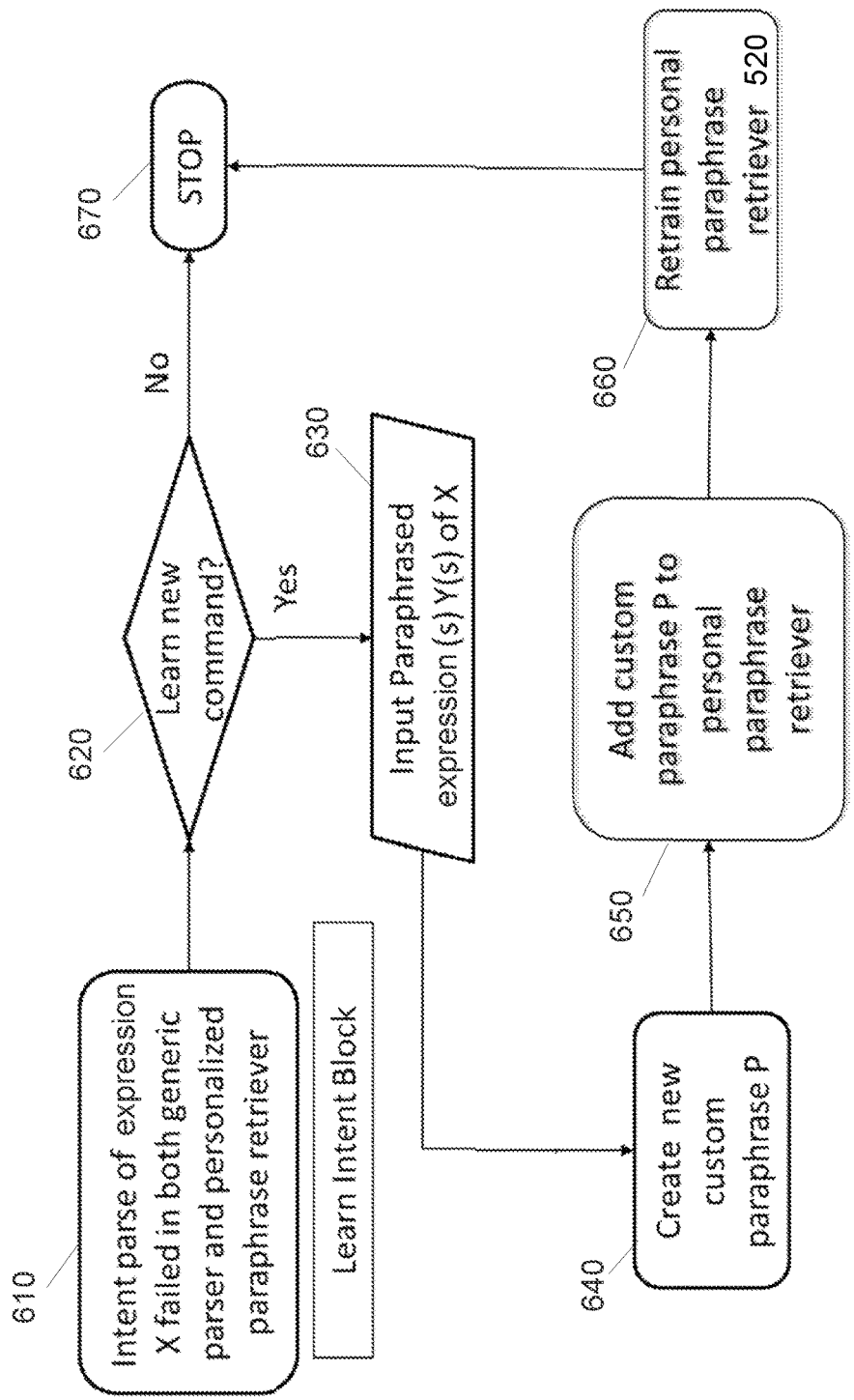
FIG. 6 shows a block diagram for customizing paraphrases for a PA, according to some embodiments.

FIG. 6 shows a block diagram for customizing paraphrases for a PA, according to some embodiments. In block 610, an intent of a NL expression X has failed to be parsed in both the generic intent parser 510 (FIG. 5) and the personalized paraphrase retriever 520, and the intent(s) are desired to be learned by the PA. The PA prompts the user of the electronic device (e.g., electronic device 120, FIG. 2) if he/she wants to define a failed NL expression X as a new intent. In block 620 it is determined whether the user desires the PA to learn a new command. If the PA receives an NL expression of "no," then the PA proceeds to block 670 and stops (e.g., waits for the next NL expression). Otherwise, if the user desires that the PA learn the new command, the user is prompted to explain X using one NL expression or a sequence of NL paraphrased expressions Y(s). In block 630 the PA inputs the paraphrased expression(s) Y(s) of X. The PA then checks if each expression Y in Y(s) can be parsed either by the generic intent parser 510 or the personal paraphrase retriever 520 (personalized intent parser), but does not take any action at this point. If any expression in Y(s) fails to be parsed, the PA requests the user again to enter a simpler paraphrase. After the user has entered paraphrased expression(s) Y(s) of expression X, in block 640 the PA creates a new custom user specific intent "I" expressed as a sequence of paraphrased expressions P. In block 650 the PA adds the custom paraphrased expressions P and the intent I to the personal paraphrase retriever 520. In block 660 the personal paraphrase retriever 520 is retrained using all previous and the new personalized intent. The PA then proceeds to block 670 and stops (e.g., waits for the next NL expression).

In some embodiments, the personal paraphrase retriever 520 may be created as follows. In one or more embodiments, the personal paraphrase retriever 520 is required to be able to map an NL expression X to one or many sequence of expressions Y(s). Essentially the personal paraphrase retriever 520 is a paraphrase generator. A paraphrase generation model (e.g., a machine learning model) that can map single NL expressions X to a sequence of expressions Y(s), which together forms a paraphrase of X is trained. This paraphrase generation model acts as the personal paraphrase retriever (personalized intent parser) 520. When a new custom intent "I" and paraphrase P are added, the PA first checks if each individual expression Y in a sequence Y(s) can be parsed by the generic intent parser 510. If so, the PA simply adds this new example {X, Y(s)} to the personal paraphrase retriever 520 and re-trains the personal paraphrase retriever (personalized intent parser) 520.

Figure 7:
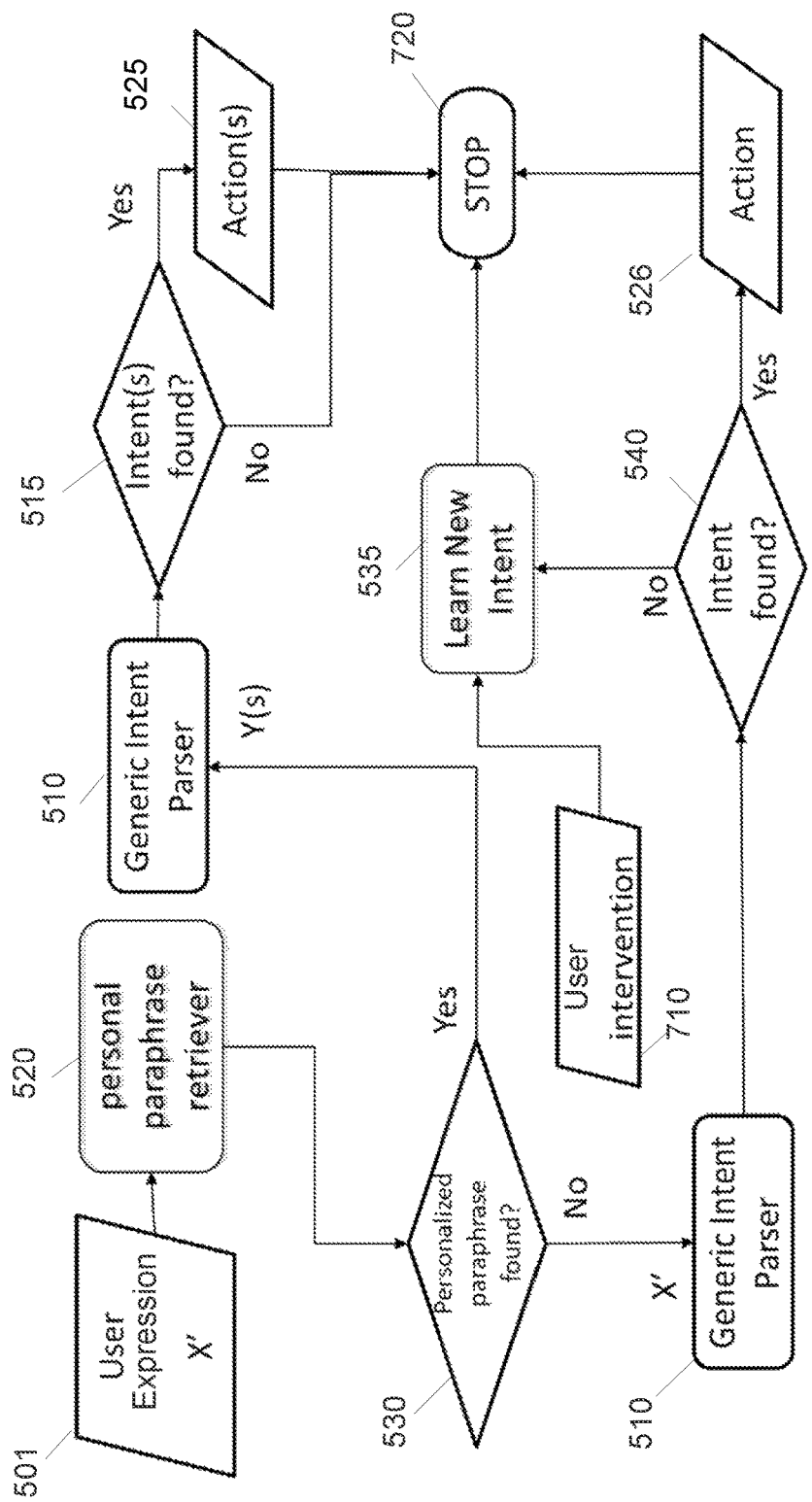
FIG. 7 shows a block diagram for proactive intent parsing for a PA, according to some embodiments.

FIG. 7 shows a block diagram for proactive intent parsing for a PA, according to some embodiments. In some embodiments, in block 501 a user NL expression X' 501 is received and then parsed using the personal paraphrase retriever (personalized intent parser) 520. In block 530, it is determined whether the personal paraphrase retriever 520 finds the paraphrase (e.g., expressed as a sequence of expressions Y(s)). If the personal paraphrase retriever 520 found the paraphrase, the expression sequence Y(s) are sent to the generic intent parser 510 to be parsed. In block 515 if is determined whether the intent(s) is(are) found in the generic intent parser 510. If the intent(s) is(are) found, then in block 525 the corresponding action(s) are executed and the PA processing stops at block 720 (e.g., the PA waits for the next NL expression to act upon). If the personal paraphrase retriever 520 did not find the paraphrase in block 530, the NL expression X' 501 (instead of Y(s)) is sent to be parsed by the generic intent parser 510. In block 540 if the intent(s) is(are) found, then in block 526 the corresponding action is executed, and the PA processing stops at block 720. If no intent(s) is(are) fond in block 540, then the NL expression X' is sent to block 535 to learn the new intent(s) using machine learning (e.g., the learn intent process, FIG. 6) and user input. The PA processing then proceeds to block 720 and stops (e.g., waits for the next NL expression. In some embodiments, for block 710 the PA processing also has a user intervention 710 input process where the user may define a new intent anytime, not necessarily after a parsing failure. This helps in solving Fail Case 2 (FIG. 3), which may be hard to detect by the PA without any user feedback. The proactive intent parsing for the PA processing can potentially mitigate both Fail Case 1 and 2, if the user chooses to define X' as a new paraphrased/personalized intent.

Figure 8:
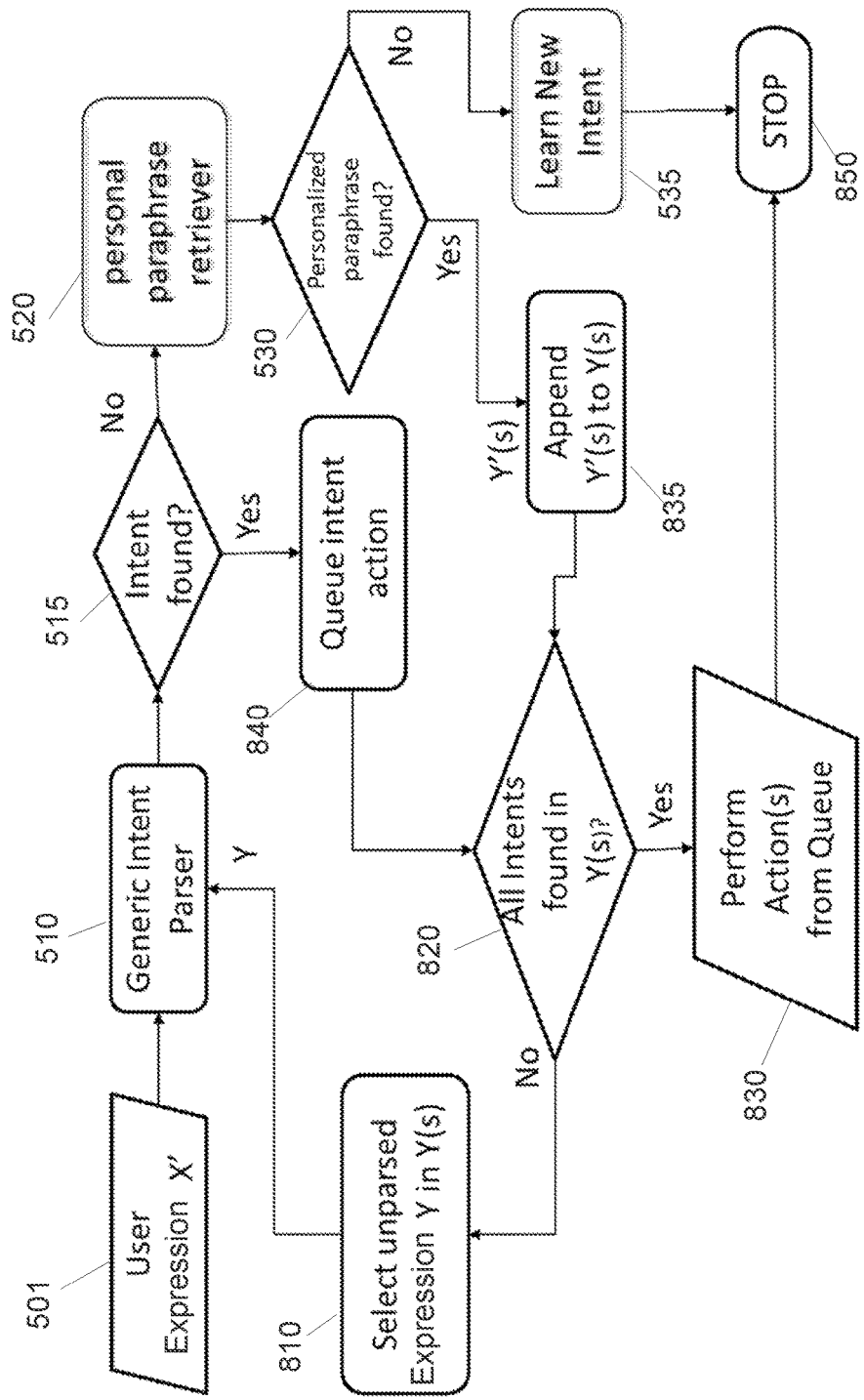
FIG. 8 shows a block diagram for recursive reactive intent parsing for a PA, according to some embodiments.

FIG. 8 shows a block diagram for recursive reactive intent parsing for a PA, according to some embodiments. In some embodiments, the recursive reactive intent parsing for the PA combines features from the proactive and reactive processing (e.g., FIGS. 5 and 7). In the learn new intent block 535, when the user paraphrases X' with a sequence of expressions Y(s), the PA processing also allows one or many of these paraphrased expressions to be personalized expressions themselves, which may be mapped to a current paraphrased/personalized intent in the personal paraphrase retriever (personalized intent parser) 520.

In one or more embodiments, in block 501 a user NL expression X' is received and sent to the generic intent parser 510. In block 515, if the intent for the user NL expression X' 501 is found, the PA processing proceeds to block 840 where intent action is queued. The PA processing proceeds to block 820 where it is determined whether all intent(s) is(are) found in the paraphrase(s) sequence Y(s). If all of the intent(s) is(are) found, in block 830 the PA processing performs the action(s) from the queued action(s) in block 840 and the PA processing stops at block 850 (e.g., the PA waits for the next NL expression). If not all of the intent(s) are found, the PA processing proceeds to block 810 where the unparsed expression Y in Y(s) are selected and sent to the generic intent parser 510 for recursive processing.

In one or more embodiments, in block 515 if the intent for the user NL expression X' 501 is not found, the PA processing proceeds to send the user NL expression X' 501 to the personal paraphrase retriever 520. In block 530, the PA processing determines whether the personalized paraphrase is found or not. If the personalized paraphrase is found, the PA processing proceeds to block 835 where the Y'(s) are appended to Y(s) and the PA processing proceeds to block 820 for recursive processing. Otherwise, if the personalized paraphrase is not found, the PA processing proceeds to block 535 to learn the new intent using machine learning (learn intent process, FIG. 6). The PA processing then proceeds to block 850 and stops (e.g., waits for the next NL expression).

Figure 9:
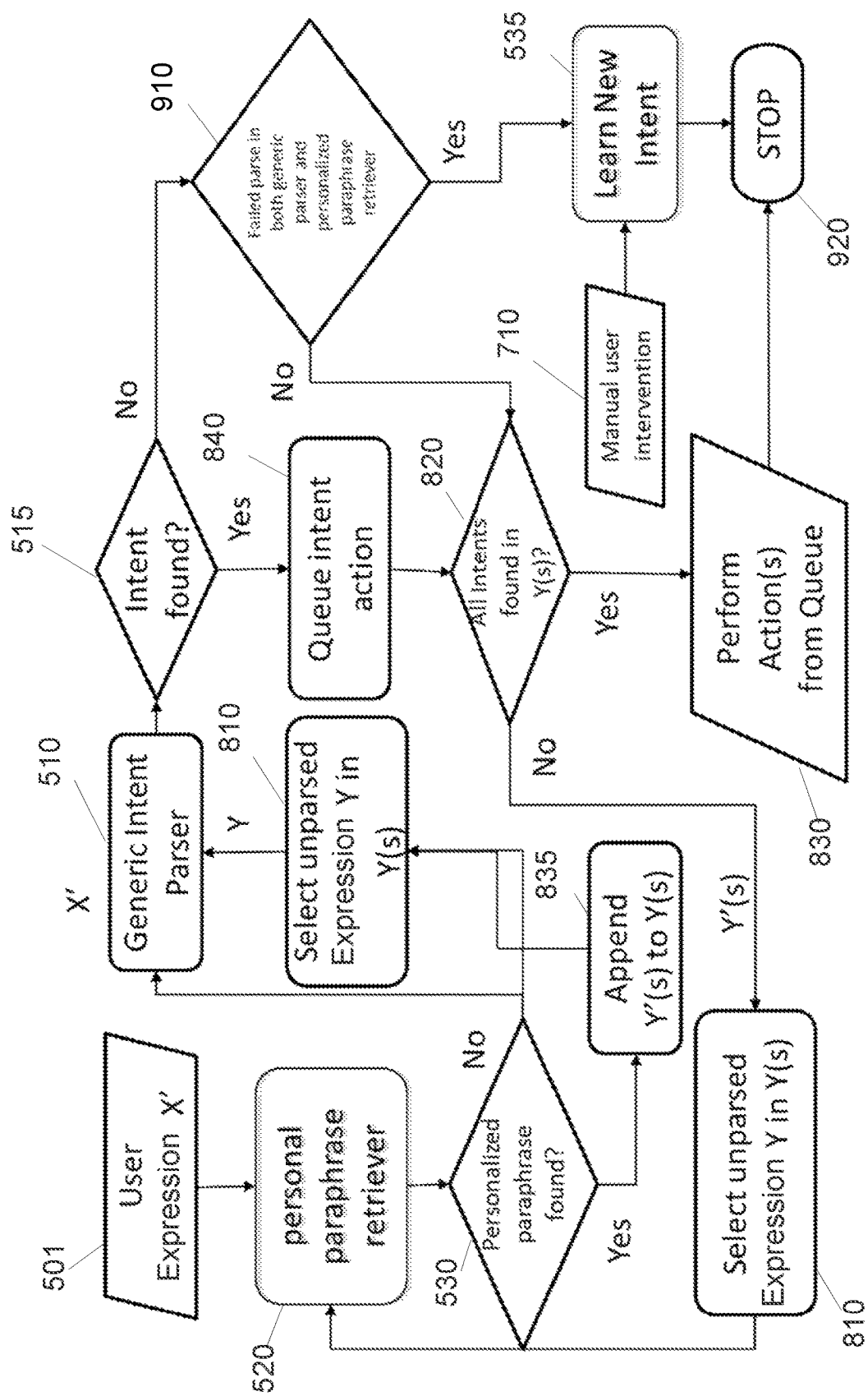
FIG. 9 shows a block diagram for recursive proactive intent parsing for a PA, according to some embodiments.

FIG. 9 shows a block diagram for recursive proactive intent parsing for a PA, according to some embodiments. In one or more embodiments, the recursive proactive intent parsing automatically detects a wrong action (or Fail Case 2, FIG. 3). When a user expression X is incorrectly parsed by the generic intent parser 510 and mapped to an incorrect action (Fail Case 2, FIG. 3), the user may themselves provide a paraphrase X' in the next expression, to correct the failed action. In some embodiments, the PA processing trains and uses a paraphrase detector (PD) to detect if two successive user expressions (X and X') are paraphrases. If the PD detects X and X' are paraphrases, the PA processing invokes the learn intent process (FIG. 6) to learn this personalized intent if the user desires to define it.

In some embodiments, in block 501 a user NL expression X' is received and sent to the personal paraphrase retriever (personal intent parser) 520. In block 530, if a personalized paraphrase for the user NL expression X' 501 is found, the PA processing proceeds to block 835 where Y'(s) are appended to Y(s). The PA processing proceeds to block 810 where an unparsed expression Y in Y(s) is selected and sent to the generic intent parser 510. PA processing then proceeds to determine whether the generic intent parser 510 found an intent(s). If it is determined that the intent(s) is(are) found in block 515, the PA processing queues the intent action and proceeds to block 820. In block 820, the PA processing determines whether all intent(s) are found in Y(s). If it is determined that all intent(s) are found in Y(s), PA processing performs the action(s) from the queued action(s) in block 830 and the PA processing stops at block 920 (e.g., the PA waits for the next NL expression). If not all of the intent(s) are found in Y(s) in block 820, the PA processing proceeds to block 810 where the unparsed expression Yin Y(s) is selected and sent to the personal paraphrase retriever 520 for recursive processing.

In one or more embodiments, in block 515 if the intent for the user NL expression X' 501 is not found, the PA processing proceeds to send the user NL expression X' 501 to block 910 where it is determined whether parsing failed to parse in both the generic intent parser 515 and the personal paraphrase retriever 520. If it is determined that parsing did fail in both parsers, the PA processing proceeds to block 535 to learn the new intent using machine learning (learn intent process, FIG. 6). The PA processing then proceeds to block 920 and stops (e.g., waits for the next NL expression). If it is determined in block 910 that not both parsers fail, the PA processing proceeds to block 820 block 820 for recursive processing.

In block 530, if a personalized paraphrase for the user NL expression X' 501 is not found, the PA processing proceeds to the generic intent parser 510 and (e.g., in parallel) to block 810 where an unparsed expression Y in Y(s) is selected and then sent to the generic intent parser 510 (while the expression X' is also sent to the generic intent parser 510). The PA processing then proceeds to block 515 and proceeds as described above.

Figure 10:
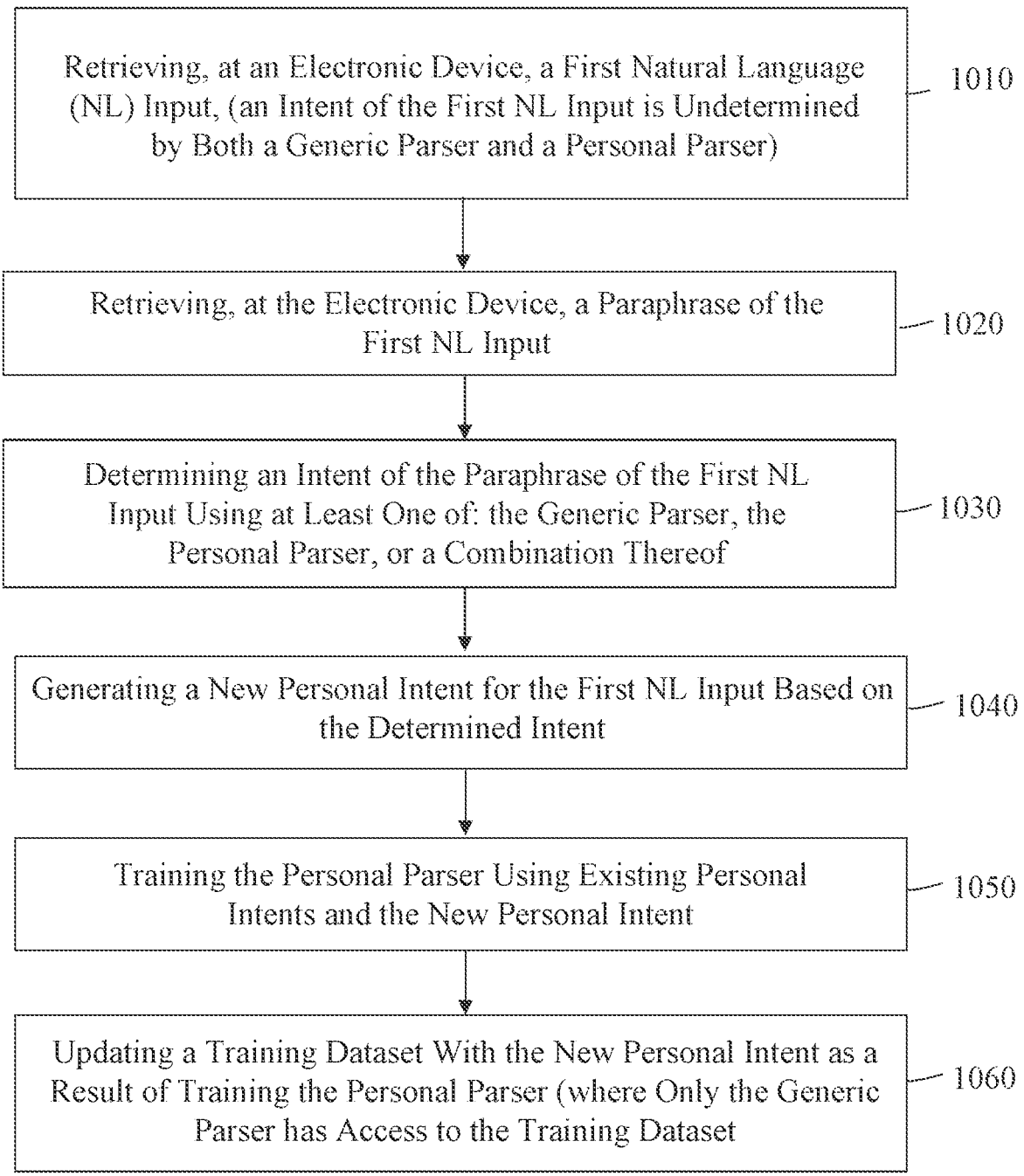
FIG. 10 shows a block diagram of a process for intent learning of personalized expressions for virtual personal assistants, according to some embodiments.

FIG. 10 shows a block diagram of a process 1000 for intent learning of personalized expressions for virtual PAs, according to some embodiments. In block 1010, process 1000 retrieves, at an electronic device (e.g., electronic device 120, FIG. 2), a first NL input (e.g., a user NL expression), where an intent of the first NL input is undetermined by both a generic parser (e.g., generic intent parser 510, FIGS. 5 and 7-9) and a personal parser (e.g., personal paraphrase retriever 520, FIGS. 5-9). In block 1020, process 1000 retrieves, at the electronic device, a paraphrase of the first NL input. In block 1030 process 1000 determines an intent of the paraphrase of the first NL input using the generic parser, the personal parser, or a combination thereof. In block 1040, process 1000 generates a new personal intent for the first NL input based on the determined intent. In block 1050, process 1000 trains the personal parser using existing personal intents and the new personal intent. In one or more embodiments, the personal parser is trained using machine learning techniques (see, e.g., FIG. 6). In block 1060, process 1000 updates a training dataset with the new personal intent as a result of training the personal parser, where only the generic parser has access to the training dataset.

In some embodiments, process 1000 may further include processing, at the electronic device, a second NL input, using the personal parser for determining a personal intent of the second NL input (the second NL input may be similar or different from the first NL input). A generic intent is determined for the second NL input, using the generic parser, upon failure to determine the personal intent.

In one or more embodiments, process 1000 may include processing, at the electronic device, a third NL input, using the personal parser for determining a personal intent of the third NL input (the third NL input may be similar or different from the first NL input). It is then determined whether the third NL input is a paraphrase of the first NL by the personal parser and determining the new personal intent for the third NL input.

In some embodiments, process 1000 may further include processing, at the electronic device, a fourth NL input, using the personal parser for determining a personal intent of the fourth NL input (the fourth NL input may be similar or different from the first NL input). The fourth NL input is parsed into a sequence of known inputs, and one or more intents for the fourth NL input are determined based on processing of the sequence of known input. In one or more embodiments, the personal parser is private and personalized (e.g., to a user of the electronic device), and the new personal intent includes a combination of default intent and personalized intent. In process 1000 the personal parser improves personalized NL understanding for an intelligent PA.

Figure 11:
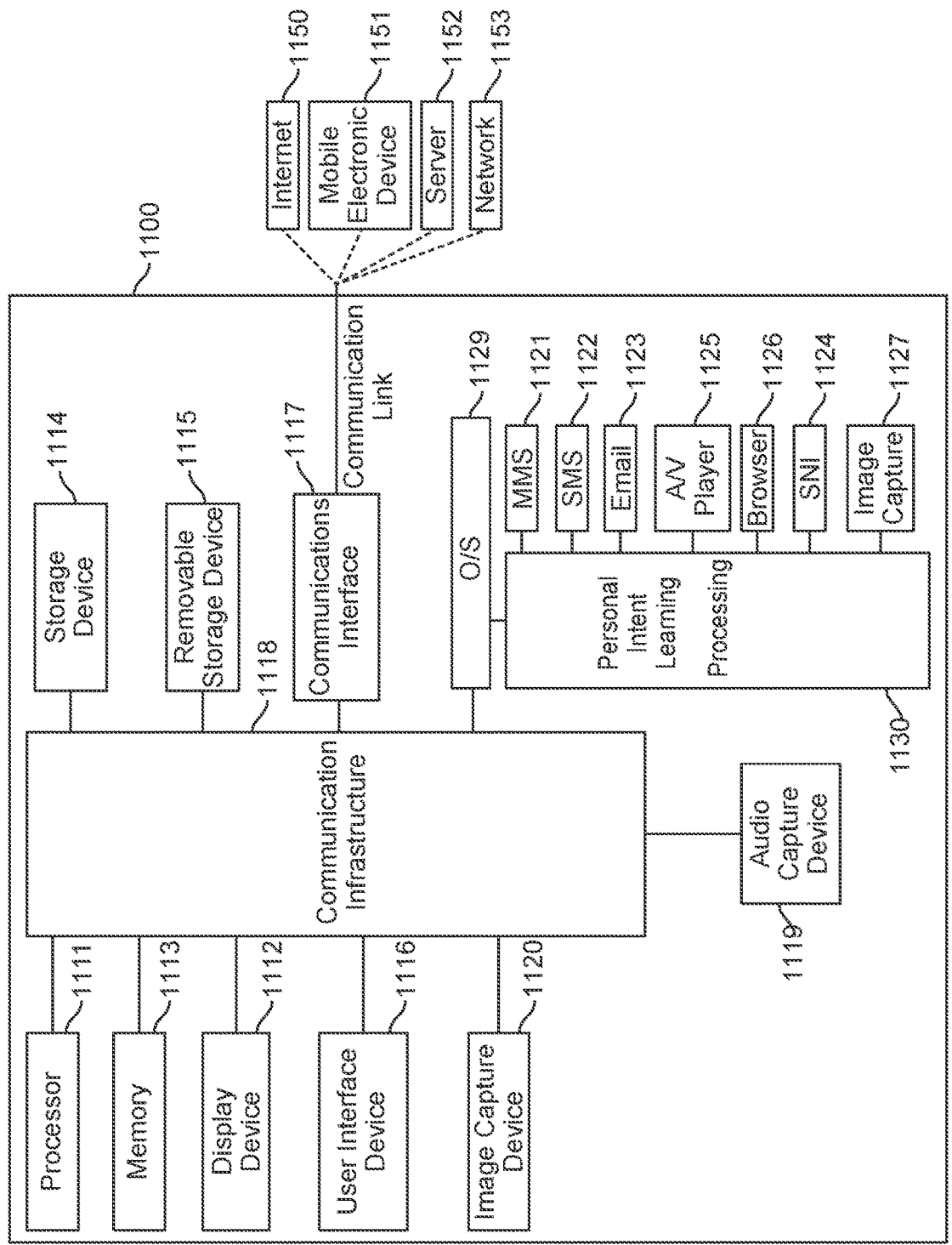
FIG. 11 is a high-level block diagram showing an information processing system comprising a computing system implementing one or more embodiments.

FIG. 11 is a high-level block diagram showing an information processing system comprising a computing system implementing one or more embodiments. The system 1100 includes one or more processors 1111 (e.g., ASIC, CPU, etc.), and may further include an electronic display device 1112 (for displaying graphics, text, and other data), a main memory 1113 (e.g., random access memory (RAM), cache devices, etc.), storage device 1114 (e.g., hard disk drive), removable storage device 1115 (e.g., removable storage drive, removable memory, a magnetic tape drive, optical disk drive, computer-readable medium having stored therein computer software and/or data), user interface device 1116 (e.g., keyboard, touch screen, keypad, pointing device), and a communication interface 1117 (e.g., modem, wireless transceiver (such as Wi-Fi, Cellular), a network interface (such as an Ethernet card), a communications port, or a PCMCIA slot and card).

The communication interface 1117 allows software and data to be transferred between the computer system and external devices through the Internet 1150, mobile electronic device 1151, a server 1152, a network 1153, etc. The system 1100 further includes a communications infrastructure 1118 (e.g., a communications bus, cross bar, or network) to which the aforementioned devices 1111 through 1117 are connected.

The information transferred via communications interface 1117 may be in the form of signals such as electronic, electromagnetic, optical, or other signals capable of being received by communications interface 1117, via a communication link that carries signals and may be implemented using wire or cable, fiber optics, a phone line, a cellular phone link, a radio frequency (RF) link, and/or other communication channels.

In one implementation of one or more embodiments in a mobile wireless device (e.g., a mobile phone, tablet, wearable device, etc.), the system 1100 further includes an image capture device 1120, such as a camera 128 (FIG. 2), and an audio capture device 1119, such as a microphone 122 (FIG. 2). The system 1100 may further include application processing or processors as MMS 1121, SMS 1122, email 1123, social network interface (SNI) 1124, audio/video (AV) player 1125, web browser 1126, image capture 1127, etc.

In one embodiment, the system 1100 includes personal intent learning processing 1130 that may implement processing similar as described regarding personal intent learning app 129 (FIG. 2), and for processing described above in relation to FIGS. 5-10. In one embodiment, the personal intent learning processing 1130 along with an operating system 1129 may be implemented as executable code residing in memory of the system 1100. In another embodiment, the personal intent learning processing 1130 may be provided in hardware, firmware, etc.

In one embodiment, the main memory 1113, storage device 1114 and removable storage device 1115, each by themselves or in any combination, may store instructions for the embodiments described above that may be executed by the one or more processors 1111.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   retrieving, at an electronic device, a first natural language (NL) input, wherein an intent of the first NL input is undetermined by both a generic parser and a personal parser, wherein the generic parser is the same for every user, the personal parser is private and different for every user, and the generic parser and the personal parser each comprise an NL processing (NLP) intent parser that parses expressions to desired user intents for performing desired actions;
   retrieving, at the electronic device, a paraphrase of the first NL input;
   determining whether an intent of the paraphrase of the first NL input is found using the generic parser;
   upon the generic parser failing to determine the intent of the paraphrase, determining the intent of the paraphrase using the personal parser;
   generating a new personal intent for the first NL input based on the determined intent through a learn intent process;
   training the personal parser, using existing personal intents and the new personal intent;
   using a paraphrase detector for detecting whether two or more expressions are paraphrases for invoking the learn intent process; and
   upon both of the generic parser and the personal parser failing to determine the intent of the paraphrase of the first NL input:
      displaying, by the electronic device, a prompt for an explanation of the paraphrase of the first NL input using one NL expression or a sequence of NL paraphrased expressions; and
      creating a new custom user specific intent expressed as a sequence of paraphrased expressions for the personal parser.

2. The method of claim 1, further comprising:
   updating a training dataset with the new personal intent as a result of training the personal parser; and
   upon any expression of the one NL expression or the sequence of NL paraphrased expressions fails to be parsed, displaying, by the electronic device, another prompt requesting a simpler paraphrase.

3. The method of claim 2, further comprising:
   adding the new custom user specific intent and the sequence of NL paraphrased expressions to the personal parser; and
   retraining the personal parser with the new custom user specific intent;
   wherein only the generic parser has access to the training dataset, wherein a next time a same intent is expressed using a similar expression, the electronic device parses the similar expression to the same intent.

4. The method of claim 2, further comprising:
processing, at the electronic device, a second NL input, using the personal parser for determining a personal intent of the second NL input, wherein the second NL input is different from the first NL input; and
determining a generic intent for the second NL input, using the generic parser, upon failure to determine the personal intent.

5. The method of claim 2, further comprising:
processing, at the electronic device, a third NL input, using the personal parser for determining a personal intent of the third NL input, wherein the third NL input is different from the first NL input;
determining the third NL input is a paraphrase of the first NL by the personal parser; and
determining the new personal intent for the third NL input.

6. The method of claim 2, further comprising:
processing, at the electronic device, a fourth NL input, using the personal parser for determining a personal intent of the fourth NL input, wherein the fourth NL input is different from the first NL input;
parsing the fourth NL input into a sequence of known inputs; and
determining one or more intents for the fourth NL input based on processing of the sequence of known input.

7. The method of claim 2,
wherein the personal parser is trained and personalized by each specific user, and the new personal intent comprises a combination of default intent and personalized intent.

8. The method of claim 2, wherein the personal parser improves personalized NL understanding for an intelligent personal assistant (PA), and training the personal parser comprises a machine learning training process.

9. An electronic device comprising:
memory storing instructions; and
at least one processor executing the instructions including a process configured to:
retrieve a first natural language (NL) input, wherein an intent of the first NL input is undetermined by both a generic parser and a personal parser, wherein the generic parser is the same for every user, the personal parser is private and different for every user, and the generic parser and the personal parser each comprise an NL processing (NLP) intent parser that parses expressions to desired user intents for performing desired actions;
retrieve a paraphrase of the first NL input;
determine whether an intent of the paraphrase of the first NL input is found using the generic parser;
upon the generic parser failing to determine the intent of the paraphrase, determine the intent of the paraphrase using the personal parser;
generate a new personal intent for the first NL input based on the determined intent;
train the personal parser using existing personal intents and the new personal intent through a learn intent process;
use a paraphrase detector for detecting whether two or more expressions are paraphrases for invoking the learn intent process;
upon both of the generic parser and the personal parser failing to determine the intent of the paraphrase of the first NL input:

display, by the electronic device, a prompt for an explanation of the paraphrase of the first NL input using one NL expression or a sequence of NL paraphrased expressions; and
create a new custom user specific intent expressed as a sequence of paraphrased expressions for the personal parser.

10. The electronic device of claim 9, wherein the process is further configured to:
update a training dataset with the new personal intent as a result of training the personal parser; and
upon any expression of the one NL expression or the sequence of NL paraphrased expressions fails to be parsed, displaying, by the electronic device, another prompt requesting a simpler paraphrase;
wherein only the generic parser has access to the training dataset.

11. The electronic device of claim 9, wherein the process is further configured to:
add the new custom user specific intent and the sequence of NL paraphrased expression to the personal parser; and
retrain the personal parser with the new custom user specific intent, wherein a next time a same intent is expressed using a similar expression, the electronic device parses the similar expression to the same intent;
process a second NL input using the personal parser for determining a personal intent of the second NL input, wherein the second NL input is different from the first NL input; and
determine a generic intent for the second NL input, using the generic parser, upon failure to determine the personal intent.

12. The electronic device of claim 9, wherein the process is further configured to:
process a third NL input using the personal parser for determining a personal intent of the third NL input, wherein the third NL input is different from the first NL input;
determine the third NL input is a paraphrase of the first NL by the personal parser; and
determine the new personal intent for the third NL input.

13. The electronic device of claim 9, wherein the process is further configured to:
process a fourth NL input using the personal parser for determining a personal intent of the fourth NL input, wherein the fourth NL input is different from the first NL input;
parse the fourth NL input into a sequence of known inputs; and
determine one or more intents for the fourth NL input based on processing of the sequence of known input.

14. The electronic device of claim 9, wherein:
the personal parser is trained and personalized by each specific user;
the new personal intent comprises a combination of default intent and personalized intent;
the personal parser improves personalized NL understanding for an intelligent personal assistant (PA); and
training the personal parser comprises a machine learning training process.

15. A non-transitory processor-readable medium that includes a program that when executed by a processor performing a method comprising:
retrieving, at an electronic device, a first natural language (NL) input, wherein an intent of the first NL input is undetermined by both a generic parser and a personal parser, wherein the generic parser is the same for every user, the personal parser is private and different for every user, and the generic parser and the personal parser each comprise an NL processing (NLP) intent parser that parses expressions to desired user intents for performing desired actions;

retrieving, at the electronic device, a paraphrase of the first NL input;

determining whether an intent of the paraphrase of the first NL input is found using the generic parser;

upon the generic parser failing to determine the intent of the paraphrase of the first NL input, determining the intent of the paraphrase using the personal parser;

generating a new personal intent for the first NL input based on the determined intent through a learn intent process;

training the personal parser using existing personal intents and the new personal intent;

using a paraphrase detector for detecting whether two or more expressions are paraphrases for invoking the learn intent process;

upon both of the generic parser and the personal parser failing to determine the intent of the paraphrase of the first NL input:
- displaying, by the electronic device, a prompt for an explanation of the paraphrase of the first NL input using one NL expression or a sequence of NL paraphrased expressions; and
- creating a new custom user specific intent expressed as a sequence of paraphrased expressions for the personal parser.

16. The non-transitory processor-readable medium of claim 15, wherein the method further comprises:

updating a training dataset with the new personal intent as a result of training the personal parser; and upon any expression of the one NL expression or the sequence of NL paraphrased expressions fails to be parsed, displaying, by the electronic device, another prompt requesting a simpler paraphrase;

wherein only the generic parser has access to the training dataset.

17. The non-transitory processor-readable medium of claim 15, wherein the method further comprises:

processing, at the electronic device, a second NL input, using the personal parser for determining a personal intent of the second NL input, wherein the second NL input is different from the first NL input; and determining a generic intent for the second NL input, using the generic parser, upon failure to determine the personal intent.

18. The non-transitory processor-readable medium of claim 15, wherein the method further comprises:

processing, at the electronic device, a third NL input, using the personal parser for determining a personal intent of the third NL input, wherein the third NL input is different from the first NL input;

determining the third NL input is a paraphrase of the first NL by the personal parser; and determining the new personal intent for the third NL input.

19. The non-transitory processor-readable medium of claim 16, wherein the method further comprises:

processing, at the electronic device, a fourth NL input, using the personal parser for determining a personal intent of the fourth NL input, wherein the fourth NL input is different from the first NL input;

parsing the fourth NL input into a sequence of known inputs; and determining one or more intents for the fourth NL input based on processing of the sequence of known input.

20. The non-transitory processor-readable medium of claim 15, wherein:

the method further comprises:
- adding the new custom user specific intent and the sequence of NL paraphrased expression to the personal parser; and
- retraining the personal parser with the new custom user specific intent, wherein a next time a same intent is expressed using a similar expression, the electronic device parses the similar expression to the same intent;

the personal parser is trained and personalized by each specific user;

the new personal intent comprises a combination of default intent and personalized intent;

the personal parser improves personalized NL understanding for an intelligent personal assistant (PA); and training the personal parser comprises a machine learning training process.

* * * * *